(12) United States Patent
Kumar et al.

(10) Patent No.: US 8,625,559 B2
(45) Date of Patent: Jan. 7, 2014

(54) SYSTEM AND METHOD FOR ENHANCING PERSONAL DEVICE COMMUNICATION CAPABILITIES USING MODIFIED BATTERY MODULE

(76) Inventors: Prem Jothipragasam Kumar, San Diego, CA (US); Thomas O'Neil, La Jolla, CA (US); Robbin David Hughes, San Diego, CA (US)

( * ) Notice: Subject to any disclaimer, the term of this patent is extended or adjusted under 35 U.S.C. 154(b) by 139 days.

(21) Appl. No.: 13/217,457

(22) Filed: Aug. 25, 2011

(65) Prior Publication Data

US 2012/0051347 A1     Mar. 1, 2012

Related U.S. Application Data

(60) Provisional application No. 61/376,849, filed on Aug. 25, 2010.

(51) Int. Cl.
   *H04W 4/00*     (2009.01)
(52) U.S. Cl.
   USPC .......................................... 370/338; 455/103
(58) Field of Classification Search
   None
   See application file for complete search history.

(56) References Cited

U.S. PATENT DOCUMENTS

| | | | | |
|---|---|---|---|---|
| 6,456,036 | B1* | 9/2002 | Thandiwe | 320/106 |
| 2003/0068034 | A1* | 4/2003 | Silvester | 379/433.12 |
| 2003/0083058 | A1* | 5/2003 | Mayer | 455/422 |
| 2004/0263117 | A1* | 12/2004 | Kogan et al. | 320/114 |
| 2008/0206627 | A1* | 8/2008 | Wright | 429/93 |
| 2009/0111501 | A1* | 4/2009 | Tang et al. | 455/522 |
| 2010/0161257 | A1* | 6/2010 | Cornett et al. | 702/63 |
| 2010/0329181 | A1* | 12/2010 | Lan | 370/328 |

* cited by examiner

*Primary Examiner* — Chirag Shah
*Assistant Examiner* — Rina Pancholi

(57) ABSTRACT

One or more embodiments of the present invention disclose a system and method for enhancing the communication capabilities of a personal electronic device by modifying its existing battery module, adding communication circuitry to the modified module, and providing for the personal device to communicate in a Wireless Wide Area Network (WWAN) via this modified battery module. The system and method consists of a personal device's existing battery pack modified to contain one or more wireless communication circuits, the wireless communication circuitry included in the modified battery module, and the method by which the personal device will communicate to the WWAN using the modified battery module. The system can also be used to re-distribute WWAN communication from the modified battery module, to one or more external personal devices, using near-field communications.

16 Claims, 6 Drawing Sheets

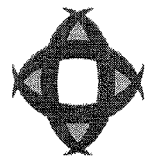
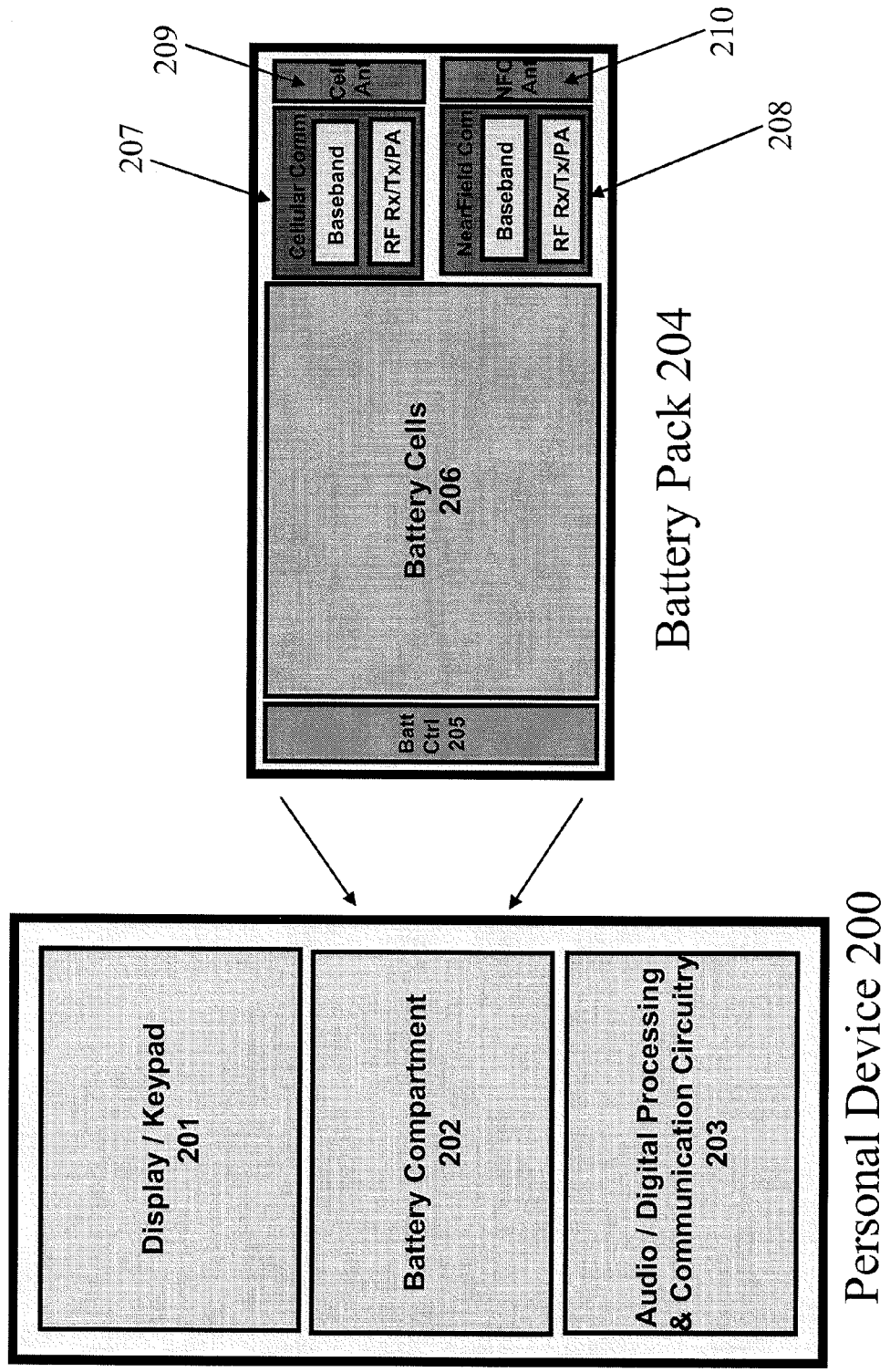
Fig 2 – Personal Device with Modified Battery

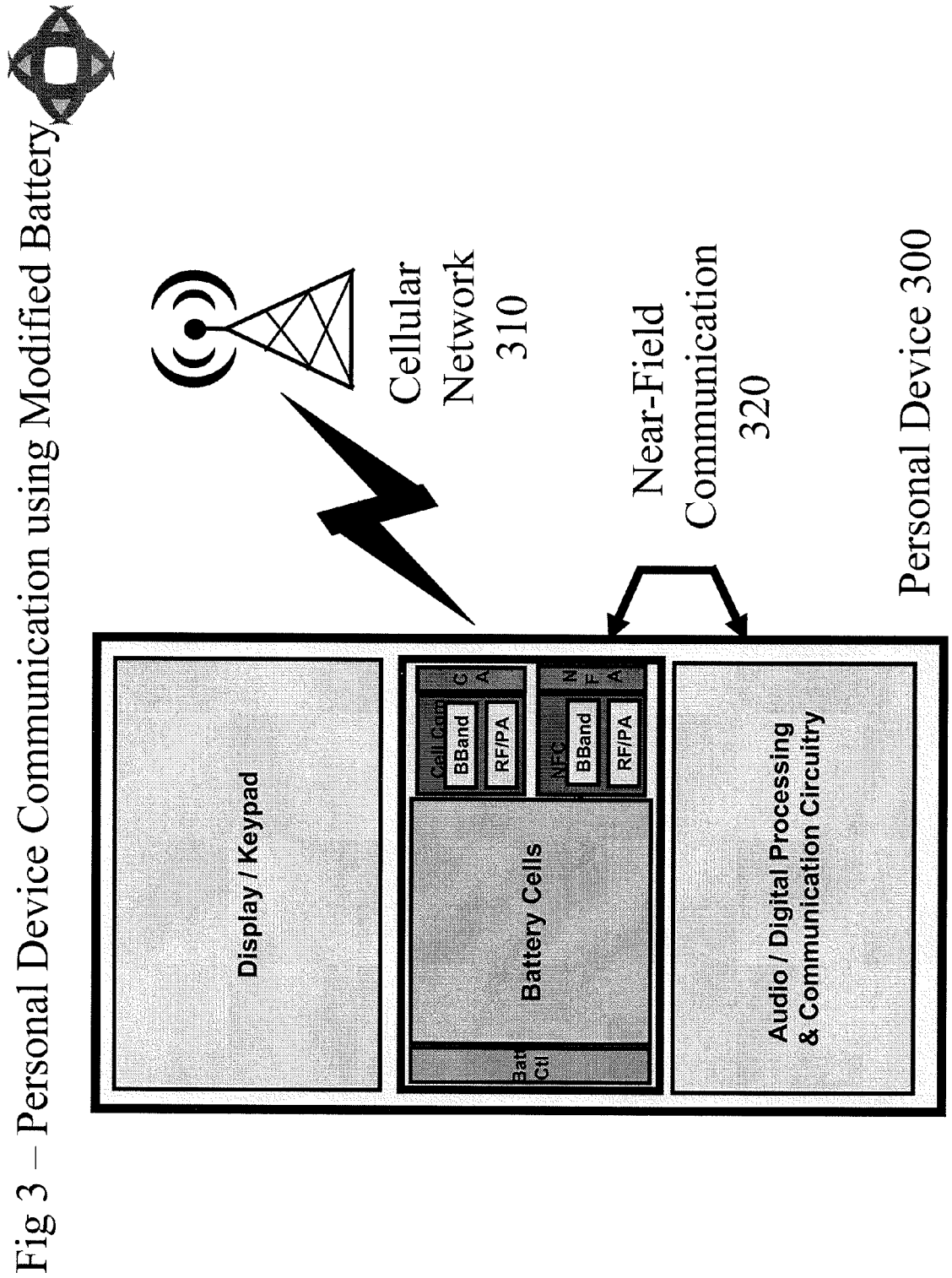
Fig 3 – Personal Device Communication using Modified Battery

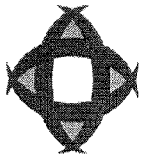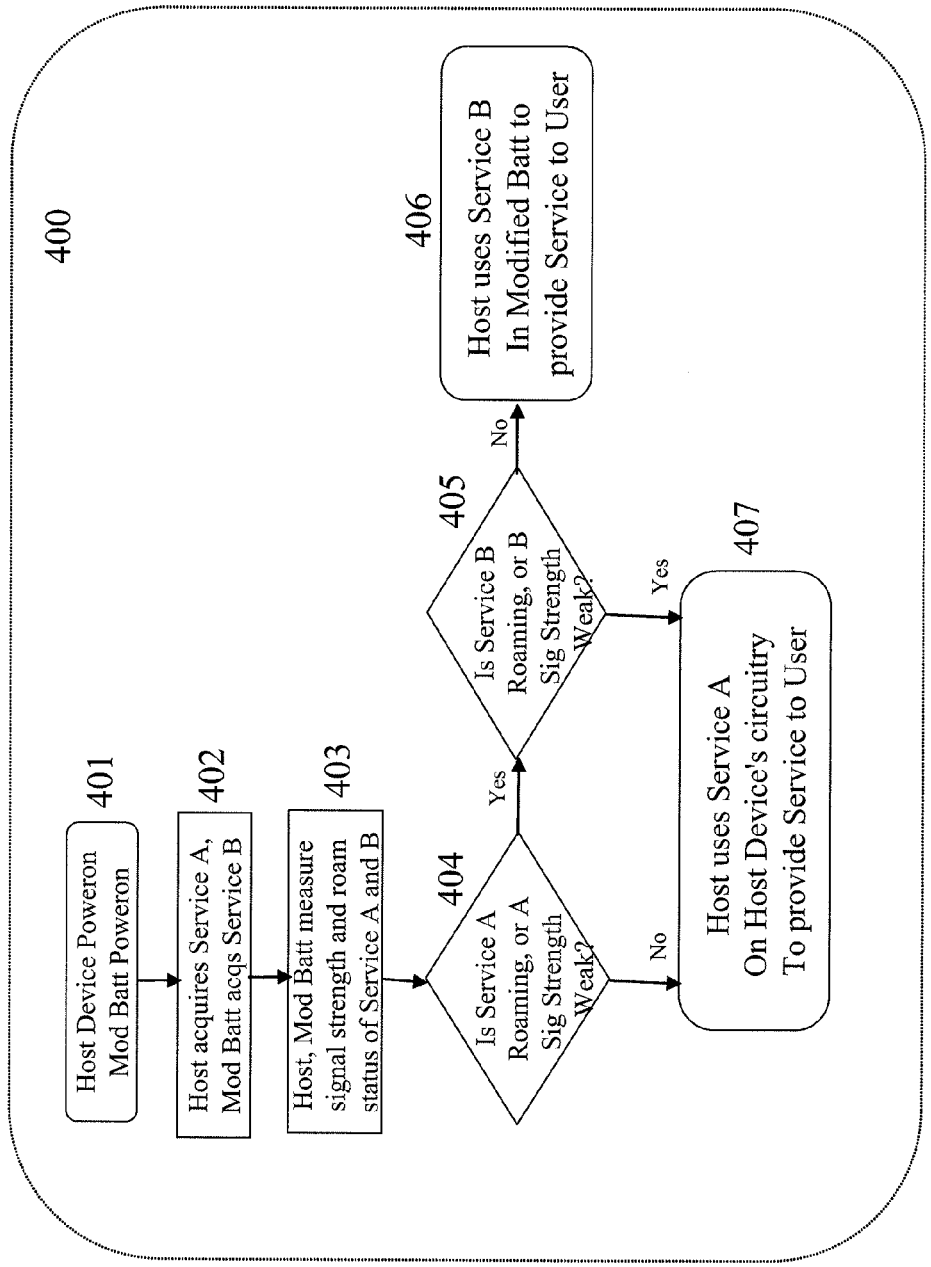
Fig 4 – Decision Tree of Device using Modified Battery: Use decision based on Roam Status and Signal Strength

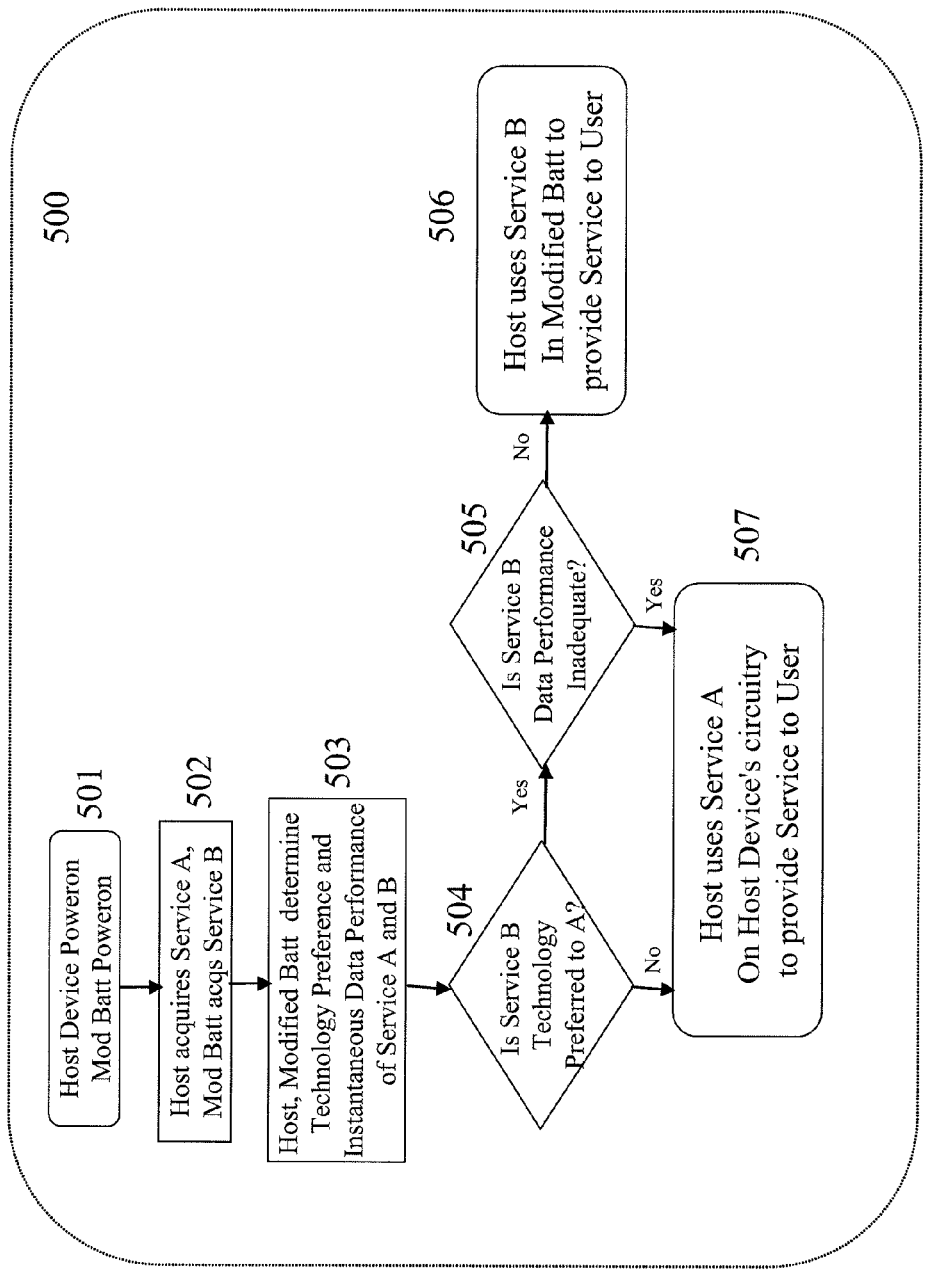
Fig 5 – Decision Tree of Device using Modified Battery:
Decision based on Data Performance and Technology Preference

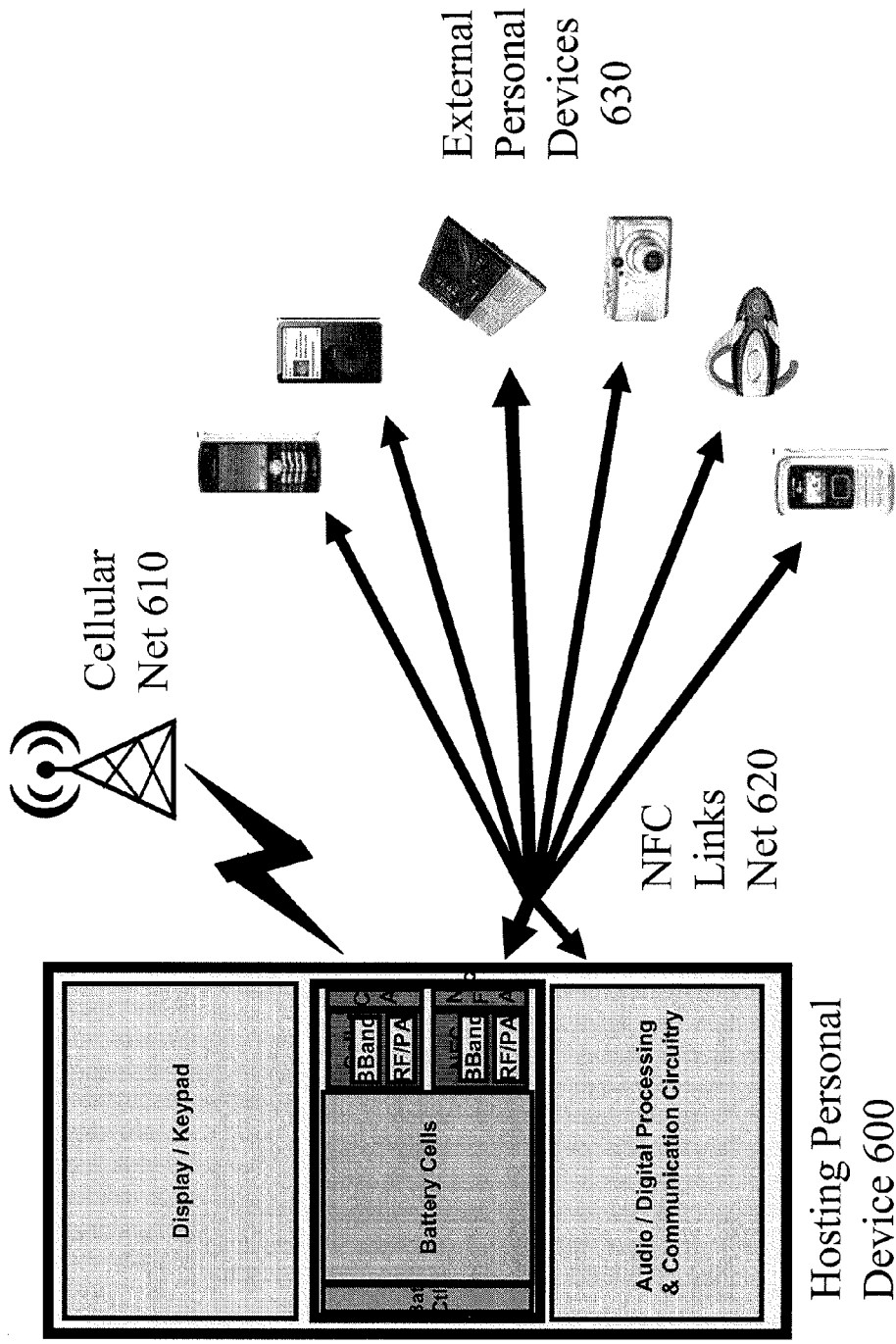
Fig 6 – Distribution of Service to External Personal Devices using Modified Battery in Hosting Personal Device

SYSTEM AND METHOD FOR ENHANCING PERSONAL DEVICE COMMUNICATION CAPABILITIES USING MODIFIED BATTERY MODULE

RELATED APPLICATIONS

The present application is based on, and claims priority from, U.S. Provisional Application No. 61/376,849, filed Aug. 25, 2011, the disclosure of which is hereby incorporated by referenced herein in its entirety.

BACKGROUND

Currently, personal devices are manufactured and sold containing a finite set of wireless communication methods. This set can be null, that is, the personal device has no communication capability, or it can have a limited number of communication methods.

However, after time of sale, the user may require an additional or newly fielded communication method which was beyond the capability of the personal device at the time of sale.

Or, it may be found that the existing communication capability of the personal device does not provide adequate connectivity, or subjects the user or network carrier to roaming charges or other expensive fees. In either case, to overcome these limitations, the user currently must purchase an entirely new personal device containing the required additional communication methods.

BRIEF DESCRIPTION OF THE DRAWINGS

One or more embodiments are illustrated by way of example, and not by limitation, in the figures of the accompanying drawings, wherein elements having the same reference numeral designations represent like elements throughout and wherein:

FIG. 2 is a high-level functional block diagram of a personal device containing a battery module assembly which has been modified to include communication circuitry, according to an embodiment of the invention;

FIG. 3 is a high-level functional block diagram of a personal device with modified battery, according to an embodiment of the invention, illustrating one method by which the personal device may use the modified battery to communicate with the WWAN;

FIG. 4 is a decision-flow diagram of processing in a personal device with modified battery, according to an embodiment of the invention, illustrating one method by which the personal device may decide to use the modified battery to communicate with the WWAN;

FIG. 5 is a decision-flow diagram of processing in a personal device with modified battery, according to another embodiment of the invention, illustrating another method by which the personal device may decide to use the modified battery to communicate with the WWAN; and FIG. 6 is a high-level functional block diagram of a personal device with modified battery, according to one embodiment of the invention, illustrating one method by which the modified battery in the hosting personal device, may be used to redistribute the communication with the WWAN, to one or multiple external personal devices, using near-field communication.

DETAILED DESCRIPTION

Figure 1:
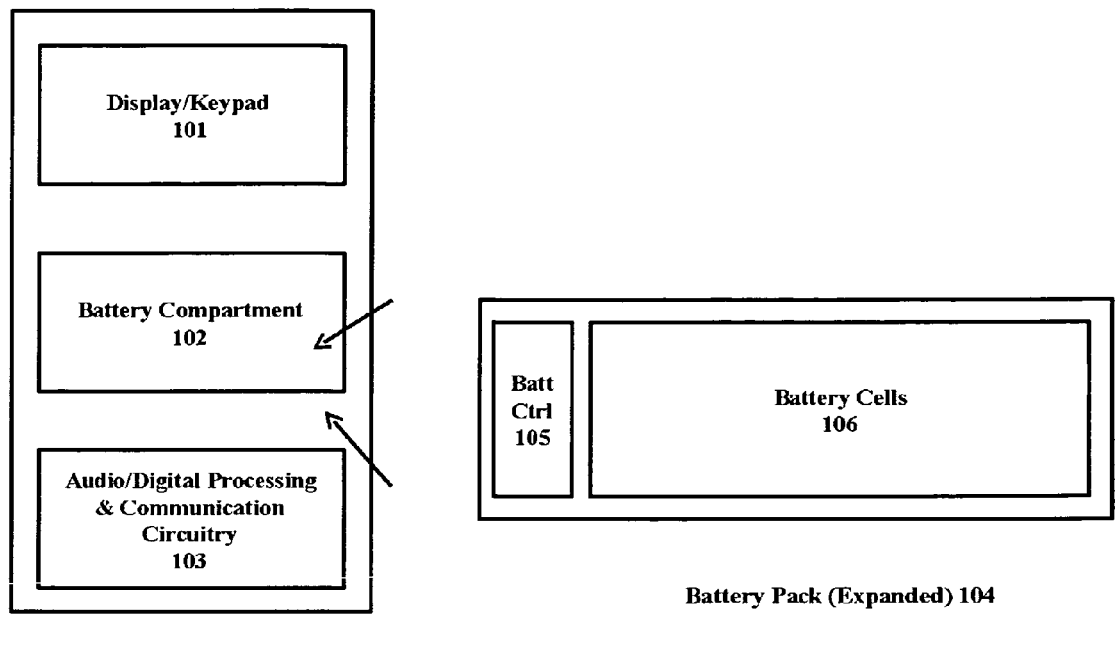
FIG. 1 is a high-level functional block diagram of a personal device containing an unmodified battery module assembly.

One or more embodiments of the present invention provide a way to update or extend the communication capability of the personal device without the user or carrier having to purchase an entirely new personal device.

Using one or more embodiments, a user may purchase, or be provided by a carrier, a modified battery pack containing the additional communication method. The personal device then uses the circuitry contained in the modified battery pack to communicate to the WWAN, instead of or in addition to its current capability.

For instance, when a new communication method such as $4^{th}$-Generation (4 G) Wireless is fielded by the carrier, the existing personal device containing only $2^{nd}$-Generation or $3^{rd}$-Gen Wireless capability need not be rendered obsolete. Instead, a modified battery pack containing 4 G Wireless communication circuitry may be inserted in the existing personal device, such that the personal device now can utilize 4 G Wireless communication capability. The same method can be used to provide a 4 G Wireless device with second generation or third generation WWAN capabilities, where the WWAN modem in the battery pack adds to the WWAN capabilities of the device.

FIG. 1 depicts a high-level functional block diagram of a personal device 100 in which an embodiment of the present invention may be incorporated. The personal device is portable, meaning it is powered by a battery module 104 containing control and charging circuitry 105, with the majority of the battery volume of the assembly taken up by energy storage cells 106 using chemical technology such as Lithium-Ion or Nickel-Cadmium, for example.

In portable personal devices, the battery assembly usually forms a removable module 104 contained within a distinct battery compartment 102. The battery module usually can be removed either by hand manipulation, or using simple tools. The reason for this modularity is that the battery assembly sometimes requires replacement. The storage cells or control circuitry may fail, may need updating to increase capacity, or may need replacing to reduce weight and size through technology improvements.

The personal device may have been manufactured containing a set of one or more methods of communication 103 with the Internet, Wireless WWAN, or other personal devices. Examples of communication methods built into the personal device at time of manufacture include (1) Telecommunications Industry Association (TIA) standard Ev-DO, revisions 0, A, and B; (2) Third-Generation Partnership Project (3GPP) standard UMTS and its variations High-Speed Packet Data (HSPA); (3) 3rd Generation Partnership Project 2 (3GPP2) standard IS-2000; (4) Groupe Special Mobile standard Global System for Mobile Communications (GSM) and its variation Enhanced Data rates for GSM Evolution (EDGE); (5) Bluetooth; and (6) Institute of Electrical and Electronics Engineers (IEEE) 802.11 Wireless LAN (aka "WiFi").

The set of communication capabilities 103 built into the personal device during manufacture and at time of sale, are usually fixed, that is, the electronics implementing these communication capabilities are not removable and cannot be replaced or upgraded easily.

After time of sale, the user may require an additional or newly-fielded communication method which was beyond the capability of the personal device at the time of sale. Or, it may be found that the existing communication capability 103 of the personal device does not provide adequate connectivity, or subjects the user or network carrier to roaming charges or other expensive fees.

To overcome these limitations without the invention described in one or more embodiments of this disclosure, the user currently must purchase an entirely new personal device containing the required additional communication methods.

For instance, if an owner of a personal device containing only EvDO (a "3rd-Generation" wireless Internet access technology) needs to access the Internet using the newly-fielded Long-Term-Evolution (LTE) standard, there is currently no easy way for the owner of the personal device to accomplish this, unless an entirely-new personal device containing hardware which implements the LTE standard is purchased.

This can be costly for the user, and wasteful of otherwise useful personal device hardware. The personal device may contain a high-cost and high-performance display, keypad, memory, audio and video camera hardware, and be in perfect working order for some communication uses. But for want of the set of newly-required communication capabilities, the entire device may be rendered obsolete and in need of replacement.

FIG. 2 depicts a high-level functional block diagram of a personal device 200 as in FIG. 1, but in which an embodiment of the present invention has been incorporated. In FIG. 2, the removable battery assembly 204 has been modified to incorporate an additional set of communication methods (207, 208) using circuitry (207, 208, 209, 210) designed to fit within the volume footprint of the battery assembly.

The additional communication circuitry (207, 208) inserted into the battery assembly may include Radio Frequency (RF) power amplifiers (PA), low-noise receiver amplifiers (LNA), frequency down-converters and digitizing hardware, baseband processing microprocessors and other discrete circuitry, and antennas (209, 210).

In the embodiment shown in FIG. 2, the set of communication methods (207, 208) include circuits designed to implement near-field communication 208 between the modified battery module and hosting personal device, as well as circuits designed to implement various WWAN standards 209. Examples of WWAN standards implemented by the modified battery 200 may include 3GPP Long-Term Evolution (LTE) and TIA standard EvDO. Examples of near-field communication implemented by the modified battery 200 may include Bluetooth or 802.11 Wireless LAN.

The additional communication circuitry (207, 208, 209, 210) inserted into the battery assembly is powered by the battery cells 206 and control circuitry 205, as is the hosting personal device. To accommodate the additional communication circuitry (207, 208, 209, 210), the battery's chemical cell 206 size has been reduced, resulting in somewhat reduced battery capacity and resulting increased frequency of charging the personal device required.

FIG. 3 depicts a high-level functional block diagram of a personal device 300 as in FIGS. 1 and 2, but illustrating how one embodiment of the present invention has been incorporated and is used by the hosting personal device.

Following FIG. 3, in one example embodiment, the personal device connects to the modified battery module using IEEE 802.11 Wireless LAN 320. The modified battery module communicates to the WWAN 310 using Long-Term Evolution (LTE), which in this example the personal device 300 did not support at time of manufacture. In this embodiment, the modified battery effectively presents a WiFi "hotspot" for the personal device to initiate and continue a TCP/IP data connection to the Internet using the LTE WWAN.

Also following FIG. 3, in another example embodiment, the personal device connects to the modified battery module using Bluetooth Near Field Communication (NFC) 300. The modified battery module communicates to the WWAN 310 using 1X-CDMA2000. In this example, the personal station only supports GSM circuit-switched calls. In this embodiment, the modified battery effectively presents a way for the personal device to initiate and continue a circuit-switched telephone connection. In this example, the personal station avoids expensive roaming charges over a non-Home GSM network when there is a Home CDMA2000 network available to use.

FIG. 4 depicts a high-level decision-tree diagram 400 illustrating how, in one embodiment of the present invention, the personal device and modified battery pair as shown in FIGS. 1, 2 and 3, may decide when to use either the host device's communication circuitry, or the modified battery's communication circuitry, to provide service to the user.

Following FIG. 4, in one example embodiment, when the personal device is powered on 401, the personal device and modified battery both attempt to acquire service 402. Subsequently, the personal device acquires Service A, while the modified battery acquires Service B. Service A and B may be one of a set of communication methods such as, but not limited to: No Service, CDMA-2000, GSM/EDGE, EvDO, UMTS/HSPA, LTE, or other wireless communication technology.

After both personal device and modified battery acquire service, software implementing decision criteria (404, 405), contained within either the personal device, or modified battery, or both, makes note of the signal strength and roam status of both Service A and Service B.

In the first decision criteria evaluation 404, if Service A's roam status is TRUE (Roaming on non-Home system) or signal strength is weak, a further decision criteria 405 is evaluated, that is, if Service B's roam status is TRUE (Roaming on non-Home system) signal strength is weak.

In the embodiment of FIG. 4, if Roam status of Service A is FALSE (in Home system not roaming), and if Service A's signal strength is strong (not weak), the personal device will use Service A to provide service to the user (action block 407).

Also in the embodiment of FIG. 4, if Roam status of Service B is TRUE (Roaming on non-Home system), or if Service B's signal strength is weak (not strong), the personal device will still use Service A to provide service to the user (action block 407).

Finally, in the embodiment of FIG. 4, if Roam status of Service A is TRUE (Roaming on non-Home system) or if Service A's signal strength is weak (not strong), AND, if the Roam status of Service B is FALSE (in Home system not roaming), and if Service B's signal strength is strong (not weak), the personal device will use Service B to provide service to the user (action block 406).

FIG. 5 depicts a high-level decision-tree diagram 500 illustrating, in another embodiment of the present invention, how a personal device and modified battery pair as shown in FIGS. 1, 2 and 3, may decide when to use either the host device's communication circuitry, or the modified battery's communication circuitry, to provide service to the user.

Following FIG. 5, in another example embodiment, when the personal device is powered on 501, the personal device and modified battery both attempt to acquire service. Subsequently, the personal device acquires Service A, while the modified battery acquires Service B (502). Service A and B may be one of a set of communication methods such as, but not limited to: No Service, CDMA-2000, GSM/EDGE, EvDO, UMTS/HSPA, LTE, or other wireless communication technology.

After both personal device and modified battery acquire service 502, software implementing decision criteria (504, 505), contained within either the personal device, or modified battery, or both, makes note of the relative preference (to user or carrier), and instantaneous data performance inherent in both Service A and Service B (503).

Then, in a first decision criterion 504 if Service B uses a technology which is preferred to Service A, a further decision criteria 505 is evaluated, that is, the instantaneous data service performance adequacy (such as serving data rate capability for example) of Service B relative to some minimum performance criterion.

FIG. 6 depicts a high-level functional block diagram of a personal device 600 as in FIGS. 1 and 2, but illustrating one method by which the modified battery in the hosting personal device, may be used to redistribute the communication with the WWAN, to one or multiple external devices, using near-field communication.

Following FIG. 6, in one example embodiment, the personal device connects to the modified battery module using IEEE 802.11 Wireless LAN or Bluetooth 620. The modified battery module communicates to the WWAN 610 using Long-Term Evolution (LTE), which in this example the personal device 600 did not support at time of manufacture. In this embodiment, the modified battery effectively presents a WiFi or Bluetooth "hotspot" for both the hosting personal device 600, and one or multiple external personal devices 630, to initiate and continue a TCP/IP data connection to the Internet using the LTE WWAN.

What is claimed is:

1. A modified removable battery module inserted into a portable personal device, the modified removable battery module comprising:
   a set of modified battery cells each of said cells having a corresponding control and a charging circuit, wherein the corresponding control and the charging circuit are physically located on the modified removable battery module;
   an additional set of communication circuitry physically located on the modified removable battery module comprising:
      a communication processing device;
      a first communication interface coupled with said communication processing device, the first communication interface arranged to communicate with the portable personal device;
      a memory coupled with said communication processing device and configured to store instructions i of a communication device control system; and
      a second communication interface coupled with said communication processing device, the second communication interface is configured to communicate with a wireless wide area communication network; and
   an enclosure housing sized to fit within a battery compartment of the portable personal device and configured to receive the set of modified battery cells, the corresponding control, the charging circuit, and the additional set of communication circuitry;
   wherein the communication device control system decides when to use a communication interface of the portable personal device outside the modified removable battery module and the second communication interface of the modified removable battery module to provide a network service to a user of the portable personal device based on a decision criteria.

2. The modified removable battery module as claimed in claim 1, wherein the second communication interface is a cellular-based communication network.

3. The modified removable battery module as claimed in claim 1, wherein the first communication interface is a near field communication interface.

4. The modified removable battery module as claimed in claim 3, wherein the near field communication interface comprises at least one of BLUETOOTH, and 802.11 Wireless LAN (WiFi), wherein said modified removable battery module is configured to initiate and continue a circuit switched telephone connection.

5. The modified removable battery module comprising the added communication circuitry as claimed in claim 1, wherein the modified removable battery module is sized to fit within the battery compartment of the portable personal device resulting in increased frequency of charging of said portable personal device.

6. The modified removable battery module comprising the added communication circuitry as claimed in claim 1, wherein the modified removable battery module is designed to provide power to acquire services, to at least one of the portable personal device, and to the communication circuitry added to the modified removable battery module.

7. The communication device control system as claimed in claim 1, wherein said system is further configured to control allocation of one or more components of a communication service with the portable personal device via the first communication interface physically located on the modified removable battery module.

8. The communication device control system as claimed in claim 1, wherein said modified removable battery module is configured to enable at least one of a Wi-Fi hotspot and Blue-tooth hotspot to continue a data connection between a first communication interface physically located on the modified removable battery module and a communication interface of the portable personal device outside the modified removable battery.

9. The modified removable battery module as claimed in claim 1, wherein the additional set of communication circuitry is configured to increase frequency of charging of said portable personal device.

10. The modified removable battery module as claimed in claim 1, wherein said module is configured to initiate and continue a circuit switched telephone connection.

11. The modified removable battery module as claimed in claim 1, wherein said the decision criteria comprises to determine instantaneous data performance in a service carrier.

12. The modified removable battery module as claimed in claim 1, wherein said the decision criteria comprises to rate performance adequacy of a service carrier.

13. A method of managing communication between a portable personal device, and a communication device control system physically located on a modified removable battery module, the method comprising:
   allocating communication connections, by said modified removable battery module in the communication device control system, between a first communication interface physically located on the modified removable battery module and a communication interface of the portable personal device outside the modified removable battery, based on at least one of a user preference or the communication device control system attribute or the portable personal device system attribute; and
   deciding when to use a communication interface of said portable personal device outside the modified removable battery module and a communication interface physically located on said modified removable battery module to provide service to a user of the portable personal device, wherein the modified battery module is inserted into the portable personal device.

14. The method as claimed in claim 10, further comprising: the modified removable battery module using a set of criterion to decide when to use a communication interface of said portable personal device outside the modified removable battery module and a communication interface physically located on said modified removable battery module to provide service to a user of the portable personal device.

15. The method as claimed in claim 14, wherein the set of criterion comprises wireless communication network availability, wireless communication network cost, performance characteristics, and inherent characteristics of the communication capabilities of the portable personal device and the modified removable battery module inserted into the portable personal device.

16. The method as claimed in claim 13, wherein the modified removable battery module in the portable personal device, redistributes the communication between a first communication interface physically located on the modified removable battery module and a communication interface of the portable personal device outside the modified removable battery with Wireless Wide Area Network (WWAN), to one or multiple external personal devices, using near-field communication.

* * * * *